United States Patent [19]

Koch

[11] 4,107,407
[45] Aug. 15, 1978

[54] BATTERY AND GRID FOR POSITIVE ELECTRODE FOR LEAD STORAGE BATTERIES

[75] Inventor: Kjell Koch, Kungälv, Sweden

[73] Assignee: Aktiebolaget Tudor, Sundbyberg, Sweden

[21] Appl. No.: 771,975

[22] Filed: Feb. 25, 1977

[30] Foreign Application Priority Data

Feb. 27, 1976 [SE] Sweden ............................... 76025956

[51] Int. Cl.² ............................................. H01M 4/56
[52] U.S. Cl. .................................... 429/225; 429/245; 75/166 B
[58] Field of Search ........................ 429/245, 225–228; 75/166 R, 166 B, 166 C, 166 D, 166 E; 29/2; 204/290 R, 291–293

[56] References Cited

U.S. PATENT DOCUMENTS

| | | | |
|---|---|---|---|
| 3,881,953 | 5/1975 | Turowski | 429/245 |
| 3,933,524 | 1/1976 | Hughel et al. | 429/225 |
| 3,947,333 | 3/1976 | Bianchi et al. | 429/225 X |

*Primary Examiner*—Charles F. LeFevour
*Attorney, Agent, or Firm*—Burns, Doane, Swecker & Mathis

[57] ABSTRACT

An improved grid for the production of positive electrodes for use in electric storage batteries is disclosed. The grid is formed of a base of lead or a lead alloy which is essentially antimony-free and the base is coated with a lead alloy containing one or more metals whereby the resulting grid achieves charging potentials essentially the same as achieved with conventional lead-antimony alloy grids while minimizing the possibilities of antimony poisoning. The grid may be made by electrically coating the surface alloy onto the support.

10 Claims, 8 Drawing Figures

BATTERY AND GRID FOR POSITIVE ELECTRODE FOR LEAD STORAGE BATTERIES

BACKGROUND OF THE INVENTION

The present invention concerns grids for positive electrodes in electrical lead storage batteries and particularly grids made from lead alloys which are free of antimony or contain only a small amount of antimony. The invention can be applied to all types of positive lead electrodes.

Grids for lead electrodes of electrical storage batteries, both positive and negative electrodes, have been made for many years of cast lead alloys, generally containing 6 to 12 percent antimony. While the antimony has been added primarily to improve the mechanical properties of the grid, it has also affected the physical structure and the electrochemical conditions in the battery cells. The antimony added to the grid alloy has contributed many advantages but it has also resulted in the important disadvantage of the so-called antimony poisoning of the negative electrode.

In order to counteract antimony poisoning, electrode grids have been produced of an antimony-free lead alloy and such grids have been used in lead storage batteries either solely for the negative electrodes or for both the positive and negative electrode. Since antimony migrates through the electrolyte from the positive electrode to the negative electrode, it has been proven insufficient to construct the grid for only the negative electrode from antimony-free lead alloys. There has therefore been an effort to make all electrode grids from antimony-free alloys and batteries incorporating such grids are produced to a limited extent. The absence of antimony from grid alloys, however, has led to other problems. There have been attempts to counter these problems in various ways, for example, by mixing antimony compounds in the active mass of the electrodes, or by making the electrode grid from alloys containing a small quantity of antimony. It has been found, though, that in order to avoid the disadvantages which are connected with antimony-free alloys, the amount of antimony in the alloys had to approach 3 to 5 percent by weight. At this level of antimony content, however, antimony poisoning of the negative electrode still occurs, even though its effect may appear after a longer time and be less powerful than at the more conventional higher levels of antimony content.

The use of antimony-free alloys at the boundary layer between grid and active material can give rise to conditions which can, among other things, cause high charging potential at the electrode grid, at least in the beginning of the charging process. The application of a thin outer layer of pure antimony to antimony-free grids has therefore been tried. Investigations have shown, however, that such grids show approximately the same high charging potential as antimony-free grids under the same conditions. It has been determined, therefore, that none of the above-mentioned methods for avoiding the effects which appear, for example, as high charging potentials have led to the desired results.

It has also been proposed, see U.S. Pat. No. 2,282,760, to form the grid of a base or support made of a conventional lead alloy obtaining a relatively high antimony content (e.g., 12 or 13 weight percent antimony, balance lead) and to coat the support with a lead alloy containing less than 0.5 (generally less than about 0.2) weight percent antimony. The absence of antimony from the grid surfaces in contact with the active material has led to other problems, however, and the use of such construction has not proven commercially attractive.

OBJECTS AND SUMMARY OF THE INVENTION

It is an object of this invention to avoid or alleviate the problems of the prior art.

It is also an object of this invention to provide a grid for a positive electrode for an electric storage battery and a method for producing such grid.

It is further an object of this invention to provide a grid for a positive electrode for an electric storage battery which minimizes the problems associated with antimony poisoning while providing charging potentials comparable with those provided by conventional lead-antimony grids.

The present invention provides a grid which combines the advantages of a grid alloy containing little or no antimony with the conditions at the boundary layer between the grid and the active material which are obtained with conventional antimony alloys. The invention also includes a method for producing such grids.

In accordance with one aspect of the present invention, there is provided a grid for a positive electrode for electrical storage battery also including a negative electrode comprising a base of lead or a lead alloy which is essentially free from antimony coated on at least all surfaces which contact active material in the finished electrode with a lead alloy of a different composition, the alloying metals of the surface layer being chosen such that the resulting grid achieves charging potentials of the same magnitude as those achieved with grids formed of lead alloys containing 6 to 12 weight percent antimony while minimixing the possibility of antimony poisoning of a negative electrode.

Another aspect of the present invention provides a method of producing grids for positive electrodes for an electric storage battery, which grids comprise lead or a lead alloy which is essentially free from antimony coated with a lead surface alloy of another composition, the alloying metals of the surface layer being chosen such that the resulting grid achieves charging potentials of the same magnitude as those achieved with grids formed of lead alloys containing 6 to 12 weight percent antimony while minimizing the possibility of antimony poisoning of a negative electrode, which comprises applying the surface alloy by an electrolytic process.

DETAILED DESCRIPTION OF THE INVENTION

Figure 1:
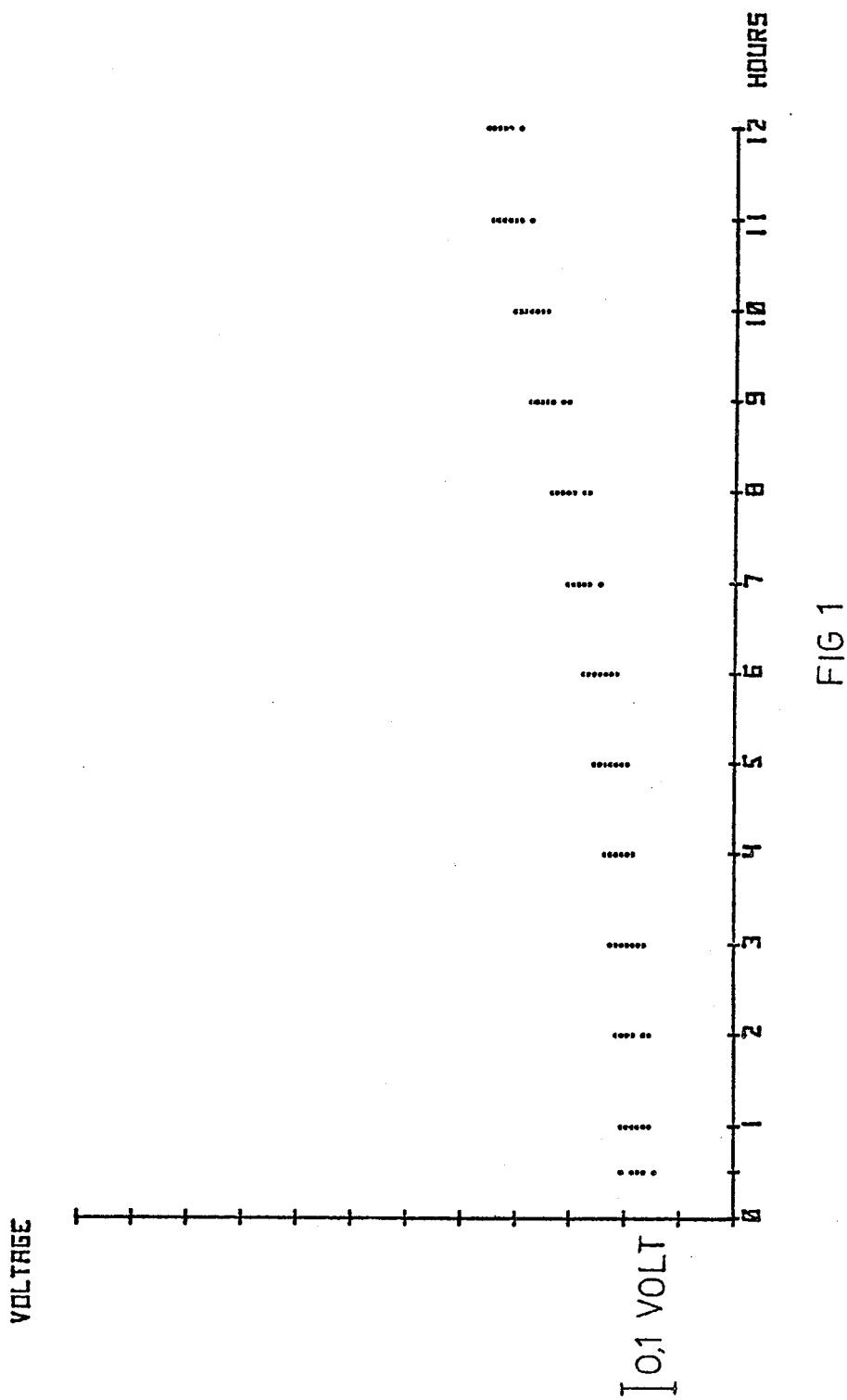
FIG. 1 is a graph of the charging potential (voltage) as a function of time for an electrode made with a grid of a conventional lead-antimony alloy.

According to the present invention, grids for the positive electrodes of electric storage batteries are made of lead or of a lead alloy which is essentially free from antimony that is, a lead alloy which contains none or only a little antimony (3 weight percent maximum). The grid is coated on its surface with a lead alloy of a different composition than the base composition. The surface alloy contains from 3 to 95 weight percent of one or more of the metals copper, silver, gold, zinc, cadmium, germanium, indium, thallium, gallium, tin, arsenic, antimony, bismuth, selenium, tellurium, chromium, molybdenum, nickel, and cobalt. It has been found that with the choice of the proper surface alloy, the same charging potential can be achieved with grids made according to the present invention as with conventional lead-antimony grids. Charging potentials are essentially less than those obtained with grids of the antimony-free or low-antimony type. The surface alloy can contain one or more of the above-named metals, although copper, silver, zinc, tin, arsenic, antimony, selenium, tellurium, molybdenum, and cobalt are preferred for economic and other reasons. Especially suitable is an alloy containing from about 3 to 95, preferably from about 5 to 25 percent, by weight antimony, balance essentially lead. Tin is also suitable for inclusion in the lead-antimony surface alloy. When antimony is utilized in the surface alloy, the risk of antimony poisoning of the negative electrodes must be considered at the same time as the desired creation of the boundary conditions between the grid and the active material which correspond to the conditions which are obtained with a homogeneous lead-antimony alloy for the grid. As the electrode utilizing a grid of the present invention with an antimony-containing coating is charged and discharged, corrosion of the grid takes place, by means of which the amount of active material is increased. Through this mechanism the positive active material gains antimony from the outer layer of the positive grid. The amount of antimony in the surface alloy should therefore be chosen so that eventual antimony poisoning of the negative electrode can be avoided. The active material in the positive electrode, however, has a certain capacity or tendency to absorb antimony. Although the maximum amount of antimony which may be absorbed without antimony poisoning has not been determined, the antimony content should not be greater than about 2 percent by weight of the active material. Preferably, the total amount of antimony in the surface alloy should be chosen so that it is less than 1, preferably about 0.5, percent by weight of the active material. The thickness of the surface alloy is generally from about 5 to 25, preferably from about 10 to 20, microns.

The invention is additionally illustrated in connection with the following Example which is to be considered as illustrative of the present invention. It should be understood, however, that the invention is not limited to the specific details of the Example.

EXAMPLE 1

Figure 2:
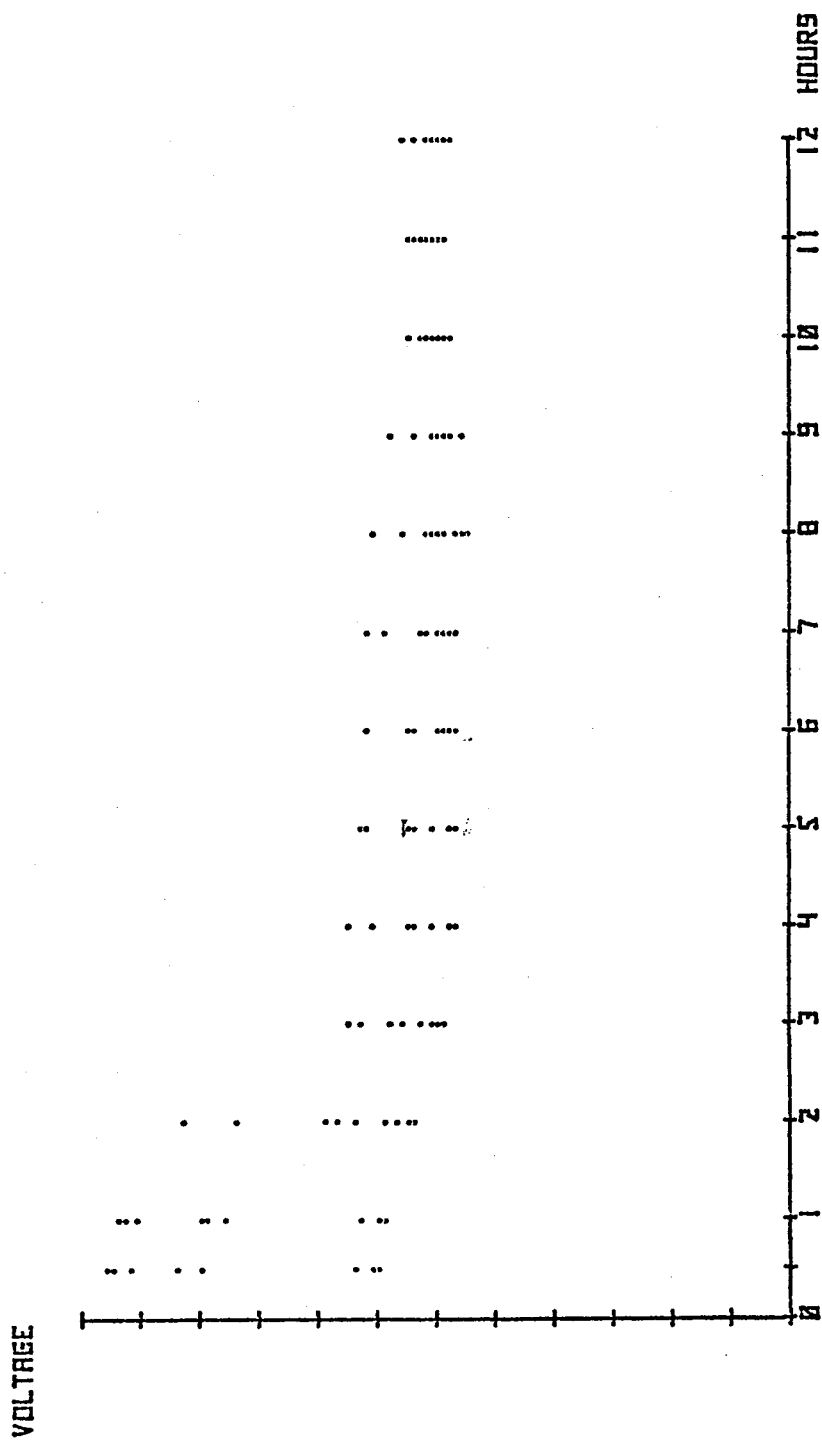
FIG. 2 is a graph of the charging potential (voltage) as a function of time for an electrode made with a grid of an antimony-free lead alloy.
Figure 3:
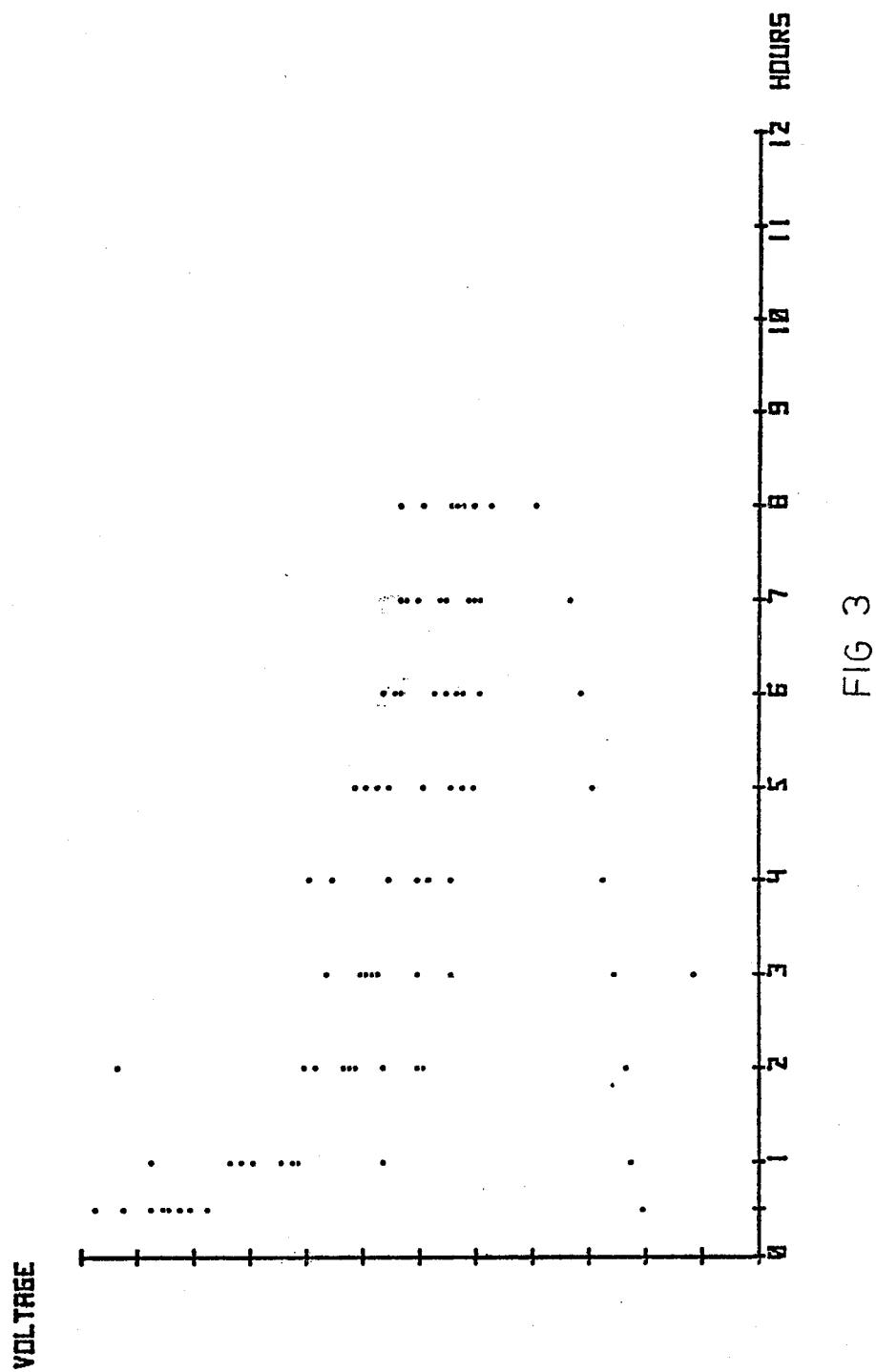
FIG. 3 is a graph of the charging potential (voltage) as a function of time for an electrode made with a grid of an antimony-free lead alloy coated with a layer of pure antimony.
Figure 4:
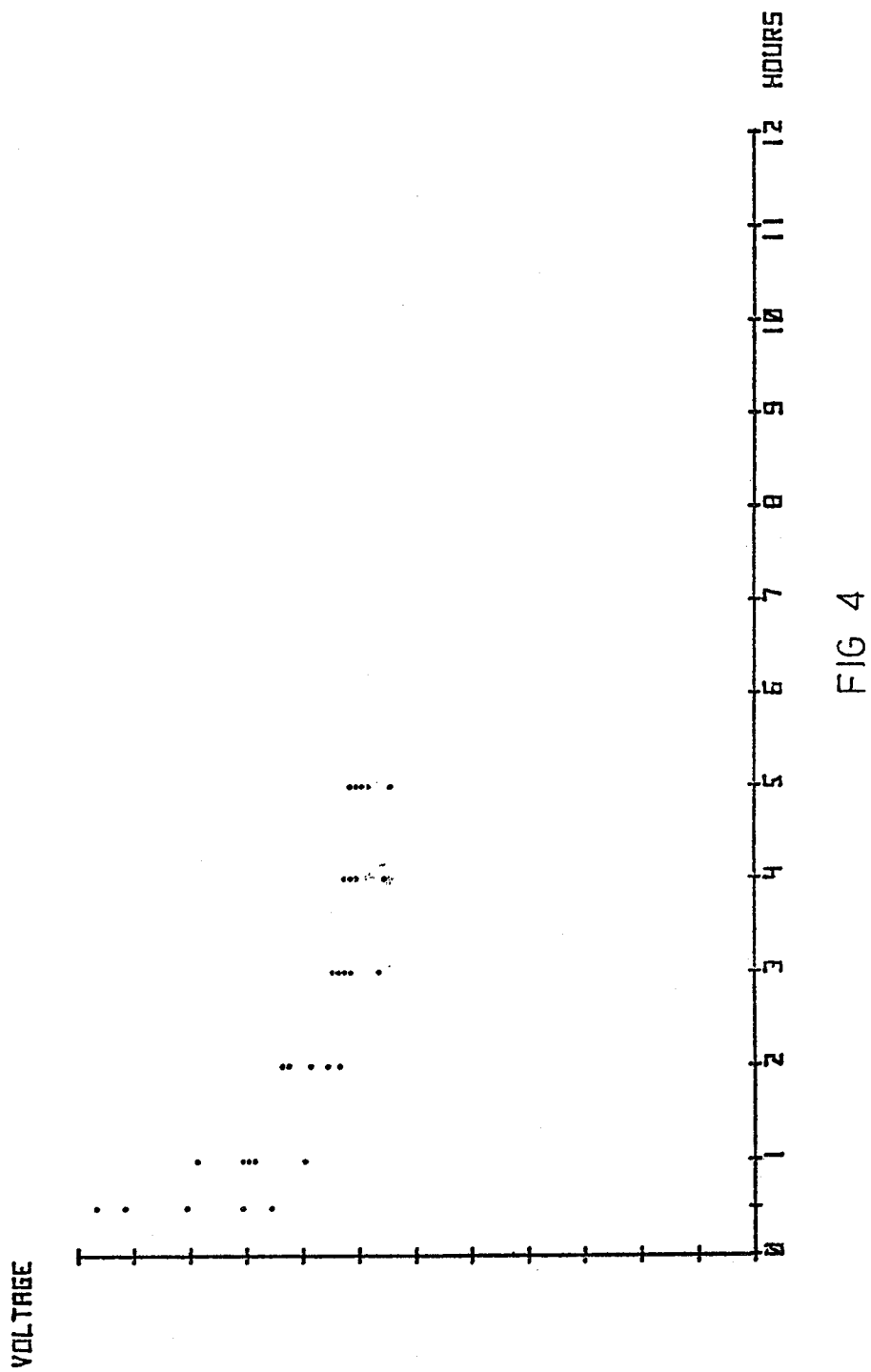
FIG. 4 is a graph of the charging potential (voltage) as a function of time for an electrode made with a grid of an antimony-free lead alloy where antimony oxide is included in the active material.
Figure 5:
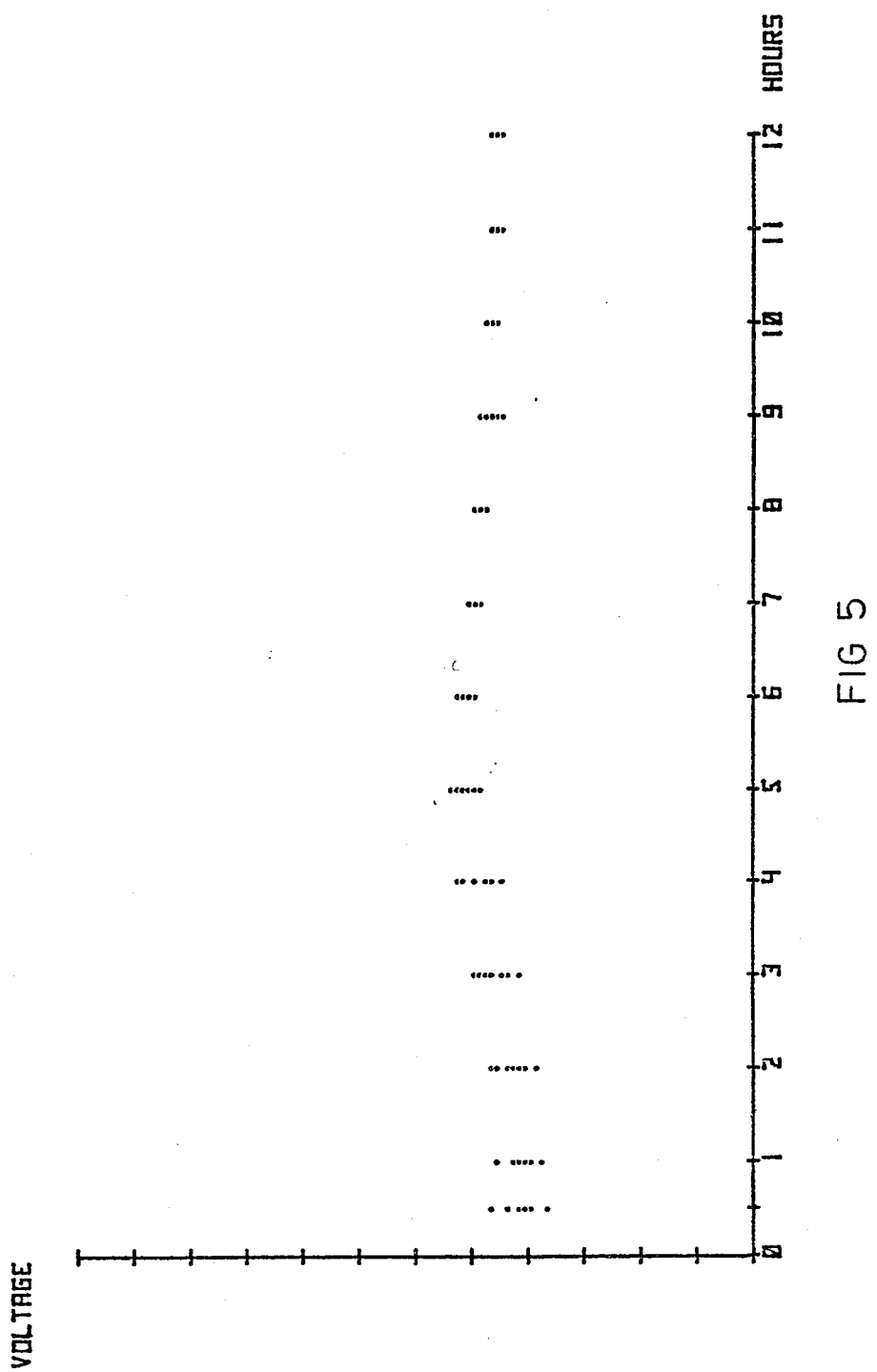
FIG. 5 is a graph of the present invention with a base of an antimony-free lead alloy coated with a lead surface alloy of 12 micrometers thickness containing 10 to 15 weight percent antimony.
Figure 6:
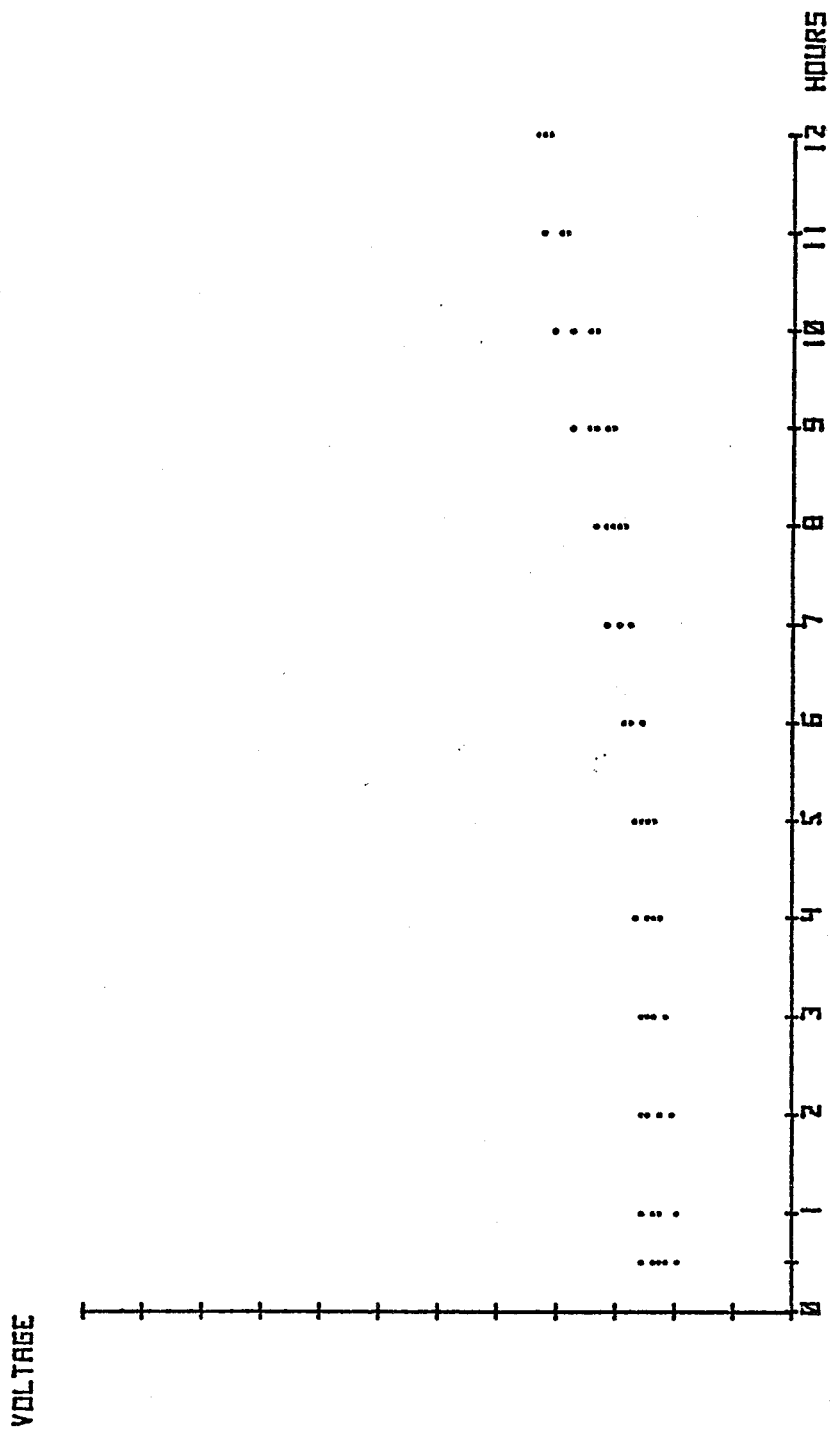
FIG. 6 is a graph of the present invention with a base of an antimony-free lead alloy coated with a lead surface alloy of 20 micrometers thickness containing 10 to 15 weight percent antimony.

Test electrodes of the so-called tubular type were built with various types of grids. After charging and discharging the electrodes, the charging potential was measured against a reference electrode of the $CdSO_4/Cd$ type. The charging current was 10 milliamperes per gram of active material. The results obtained are shown in the diagrams of FIGS. 1 to 6, which show the potential as a function of time during charging. FIG. 1 relates to an electrode with grid of conventional lead-antimony alloy. FIG. 2 relates to an electrode with grid of antimony-free lead alloy without any surface alloy or mixture of antimony compounds in the active material. The charging potentials may be seen to be noticeably higher for antimony-free alloy than for the antimony alloy. It should be mentioned that the tests were carried out under conditions which accentuated the differences in charging potential. Under other conditions the differences would be smaller. The test conditions were chosen, however, so that they correspond to actual operational conditions. FIG. 3 shows the charging potential from an electrode with grid of antimony-free alloy which was coated with a surface layer of pure antimony to a thickness of 12 micrometers. This may be seen to favorably affect the charging potential without, however, reaching the low values obtained with the conventional lead-antimony alloy. Tests were also made with thinner layers of antimony, which gave, however, a further worsening of the results. FIG. 4 shows another case of known technique, namely the mixing of antimony oxide in the active material. In this case 0.5 percent by weight of antimony pentoxide was added. The grid of the electrode was of an antimony-free lead alloy, without surface coating. The potential values obtained agree well with those obtained without additives to the active material. FIG. 5 shows the result obtained with electrodes wich are provided with grids according to the invention. In this case the grid is of antimony-free alloy and coated with a surface alloy which contained 10 to 15 weight percent antimony and had a thickness of 12 micrometers. A noticeable decrease of charging potential is obtained, although the values obtained are negligibly greater than those obtained with the conventional lead-antimony alloy. The same experiment was carried out with a layer thickness of 20 micrometers (FIG. 6) and results were obtained which essentially completely agree with those obtained with conventional lead-antimony alloys. Similar results are also obtained using alloys of lead and one or more of metals copper, silver, gold, zinc, cadmium, germanium, indium, thallium, gallium, tin, arsenic, bismuth, selenium, tellerium, chromium, molybdenum, nickel and cobalt.

Several different methods may be utilized for applying the surface alloy including electroplating, dipping in molten alloy, spray metallization, as well as deposition of evaporated metal in a vacuum. Electroplating is preferred. It is theroretically conceiveable to deposit the alloy from an electrolytic bath. The metals which are to be deposited together should preferably have the same deposition potential, i.e., cathodic potential. Important factors in this regard are metal ion concentration, temperature, current density, pH, and others. If it is desired to simultaneously deposit metals which have greatly differing deposition potentials, the proper conditions can be achieved by adding materials to the bath which form complexes with one of the metal species. In the Example above, the lead-antimony surface coating for the grid of the present invention was applied from a fluoroborate, and fluoroboric acid and small quantities of organic additive agents. Current density at deposition was 2 to 4 amperes per $dm^2$ grid area.

The use of an electrolytic process for applying the surface alloy allows control of the particular surface of the grid to be coated with surface alloy. In many cases it is desirable to coat only those surfaces which are in direct contact with active material. The electrolytic method is also very suitable for treatment of those grids which are made from drawn or cast lead wire. In this instance, the coating of the wire can proceed in a continuous process in connection with the production of the wire.

A large number of alloys may be utilized as the surface alloy for electrode grids according to the present invention. It is important, however, that the alloy contain lead to the extent that a material structure can be created which in its properties is similar to that obtained from the conventional lead-antimony alloys.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

EXAMPLE 2

Figure 7:
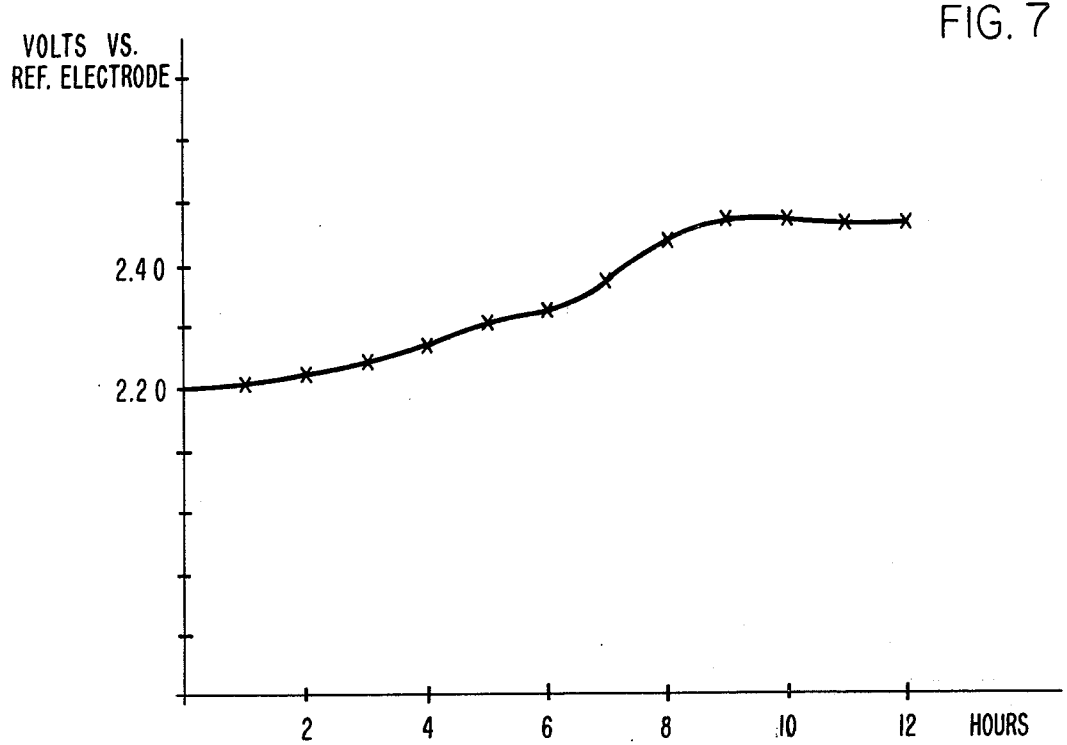
FIG. 7 is a graph of the charging potential (voltage) as a function of time for an electrode made with a grid of an antimony-free lead alloy coated with a tin-lead alloy.

Test cells weere built with grid made from an antimony free lead alloy, having a surface alloy comprising lead and tin. The electrodes were of the tubular type having an inner tube diameter of 8.3 mm. The grid spines had a diameter of 3.5 mm and were cast from an alloy comprising As—0.05%, Te—0.04% Ag—0.01%, the rest being lead with the usual small amonts of contaminants. The surface alloy had 18% tin, the rest being lead. It was applied in a layer of 20 μm thickness. The electrodes were discharged several times with currents between 5 and 10 mA per gram of active material. After each discharge the electrodes were charged with a constant current of approximately 10 mA/gram of active material. The charging potential was measured against the reference electrode as in example 1. FIG. 7 shows the potential as function of charging time as measured when charging the electrode after the third discharge.

EXAMPLE 3

Figure 8:
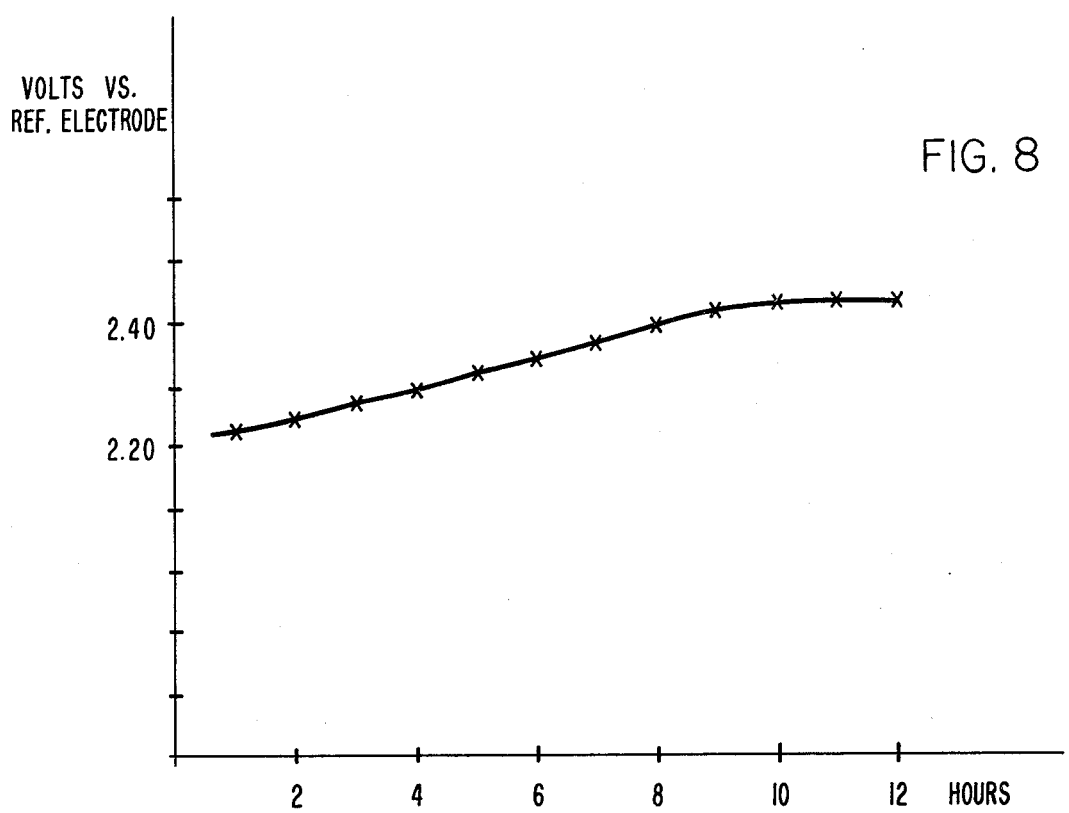
FIG. 8 is a graph of the charging potential (voltage) as a function of time for an electrode made with a grid of an antimony-free lead alloy coated with a cobalt-lead alloy.

Electrodes were made in the same way as in example 2, but with the surface alloy having a thickness of 12 μm and comprising about 3.5% Co. The surface alloy was applied as two layers of pure lead and two layers of a lead 7% Co alloy. After charging and discharging under the same conditions as given in example 2, the charging potential as function of time was recorded as illustrated by FIG. 8.

What is claimed is:

1. A grid for a positive electrode for electrical storage battery also including a negative electrode comprising a base of lead or a lead alloy which is essentially free from antimony coated on at least all surfaces which contact active material in the finished electrode with an alloy of lead and from 3 to 95 percent antimony, the amount of antimony being 2 percent or less by weight of the active material utilized in the finished electrode whereby the resulting grid achieves charging potentials of the same magnitude as those achieved with grids formed of lead alloys containing 6 to 12 weight percent antimony while minimizing the possibility of antimony poisoning of a negative electrode.

2. The grid of claim 1 whereby the surface alloy contains from 5 to 25 percent antimony.

3. The grid of claim 1 whereby the surface alloy also contains at least one further alloying metal.

4. The grid of claim 3 whereby the lead surface alloy further contains one or more of the metals selected from the group consisting of copper, silver, gold, zinc, cadmium, germanium, indium, thallium, gallium, tin, arsenic, bismuth, selenium, tellurium, chromium, molybdenum, nickel, and cobalt.

5. The grid of claim 3 whereby the surface alloy also contains tin.

6. The grid of claim 1 whereby the surface alloy contains antimony in a quantity which amounts to 0.5 percent or less by weight of the active material.

7. The grid of claim 1 whereby the surface alloy layer has a thickness of from about 2 to 25 micrometers.

8. The grid of claim 1 whereby those surfaces which come into contact with active material are coated with the said surface alloy while the remaining surfaces are partially or wholly uncoated.

9. In an lead-acid storage battery, a grid for a positive electrode comprising a base of lead or a lead alloy which is essentially free from antimony coated on at least all surfaces which contact active material in the finished electrode with an alloy of lead and from 3 to 95 percent antimony, the amount of antimony being 2 percent or less by weight of the active material utilized in the finished electrode whereby the resulting grid achieves charging potentials of the same magnitude as those achieved with grids formed of lead alloys containing 6 to 12 weight percent antimony while minimizing the possibility of antimony poisoning of a negative electrode.

10. The battery of claim 9 wherein the surface alloy of the grid contains antimony in a quantity which amounts to 0.5 percent or less by weight of the active material.

* * * * *